US010167929B2

(12) United States Patent
Okumura et al.

(10) Patent No.: US 10,167,929 B2
(45) Date of Patent: Jan. 1, 2019

(54) SPEED REDUCER AND ACTUATOR

(71) Applicants: NIDEC-SHIMPO (ZHE JIANG) CORPORATION, Pinghu, Zhejiang Province (CN); NIDEC-SHIMPO CORPORATION, Nagaokakyo-shi, Kyoto (JP)

(72) Inventors: Kanta Okumura, Nagaokakyo (JP); Dongshan Sun, Pinghu (CN)

(73) Assignees: NIDEC-SHIMPO (ZHE JIANG) CORPORATION, Pinghu (CN); NIDEC-SHIMPO CORPORATION, Kyoto (JP)

(*) Notice: Subject to any disclaimer, the term of this patent is extended or adjusted under 35 U.S.C. 154(b) by 53 days.

(21) Appl. No.: 15/626,194

(22) Filed: Jun. 19, 2017

(65) Prior Publication Data

US 2017/0370445 A1 Dec. 28, 2017

Related U.S. Application Data

(60) Provisional application No. 62/353,221, filed on Jun. 22, 2016.

(51) Int. Cl.

| | |
|---|---|
| ***F16H 1/28*** | (2006.01) |
| ***B60K 17/04*** | (2006.01) |
| *F16H 57/04* | (2010.01) |
| *F16H 57/08* | (2006.01) |

(52) U.S. Cl.

CPC ............ *F16H 1/28* (2013.01); *B60K 17/046* (2013.01); *B60Y 2200/84* (2013.01); *F16H 57/0423* (2013.01); *F16H 57/0464* (2013.01); *F16H 57/0486* (2013.01); *F16H 57/082* (2013.01)

(58) Field of Classification Search

CPC .................................................. F16H 57/0464

See application file for complete search history.

(56) References Cited

U.S. PATENT DOCUMENTS

| | | | | |
|---|---|---|---|---|
| 9,046,154 | B2 * | 6/2015 | Ishizuka | B60K 17/046 |
| 9,303,727 | B2 * | 4/2016 | Reimann | F16H 1/28 |
| 2004/0082420 | A1 * | 4/2004 | Robinson | B60K 17/046 475/183 |

FOREIGN PATENT DOCUMENTS

| | | |
|---|---|---|
| JP | 2005-104216 A | 4/2005 |
| JP | 2015-110382 A | 6/2015 |

* cited by examiner

*Primary Examiner* — Derek D Knight
(74) *Attorney, Agent, or Firm* — Keating & Bennett, LLP

(57) ABSTRACT

A speed reducer includes a sun gear, planetary gears, a fixed part, an output part, a first bearing, and a second bearing. The sun gear rotates relative to the fixed part at a first rotation speed. The planetary gears are disposed around the sun gear to engage with the sun gear. The output part includes an annular internal gear engaging with the planetary gears. The output part rotates relative to the fixed part at a second rotation speed lower than the first rotation speed. The first bearing is interposed between the fixed part and the output part at a position closer to an input side with respect to the planetary gears. The second bearing is interposed between the fixed part and the output part at a position closer to an output side with respect to the planetary gears. The second bearing is smaller in radial size than the first bearing.

15 Claims, 3 Drawing Sheets

SPEED REDUCER AND ACTUATOR

CROSS REFERENCE TO RELATED APPLICATIONS

This application claims the benefit of priority to U.S. Patent Application No. 62/353,221 filed on Jun. 22, 2016. The entire contents of this application are hereby incorporated herein by reference.

BACKGROUND OF THE INVENTION

1. Field of the Invention

The present invention relates to a speed reducer and an actuator including the speed reducer.

2. Description of the Related Art

Apparatuses such as electric wheelchairs and automated guided vehicles rotate their wheel assemblies by decelerating rotational motion obtained from a motor to increase torque. In the known art, such an apparatus is equipped with a so-called reducer-in-wheel system in which a speed reducer is disposed inside a wheel. For example, JP 2015-110382 A discloses an exemplary reducer-in-wheel system.

Specifically, JP 2015-110382 A discloses a speed reducer that includes a planetary gear mechanism having a sun gear and a planetary gear, the planetary gear mechanism being configured to transmit power. In this speed reducer, an internal gear is supported to be rotatable relative to a carrier by two bearings 71 and 72 (see paragraph 0024, FIG. 1, etc.).

A reducer-in-wheel system of this type needs to meet a strong requirement of miniaturization since it is housed inside a wheel assembly. In particular, it has been recently required to develop a reducer-in-wheel system being capable of adapting to a smaller wheel assembly. According to JP 2015-110382 A, the bearings 71 and 72 are identical in diameter with each other. Moreover, the wheel assembly is fixed to the internal gear at a radially outer side of the two bearings 71 and 72. Such a structure has a problem that it is difficult to further miniaturize the wheel assembly.

This problem may also occur at a speed reducer to be disposed inside an object to be driven, such as a fan, in addition to the wheel assembly.

The present invention provides a speed reducer to be disposed inside an object to be driven, the speed reducer having a structure capable of adapting to miniaturization of the object to be driven.

SUMMARY OF THE INVENTION

An exemplary embodiment of this application provides a speed reducer for converting rotational motion about a rotation axis extending between an input side and an output side, at a first rotation speed into rotational motion at a second rotation speed being lower than the first rotation speed. The speed reducer includes: a fixed part; a sun gear that rotates relative to the fixed part about the rotation axis at the first rotation speed; a plurality of planetary gears that are disposed around the sun gear to engage with the sun gear; an output part that includes an internal gear having an annular shape and engaging with the plurality of planetary gears and rotates relative to the fixed part at the second rotation speed; a first bearing that is interposed between the fixed part and the output part at a position closer to the input side with respect to the plurality of planetary gears; and a second bearing that is interposed between the fixed part and the output part at a position closer to the output side with respect to the plurality of planetary gears. A radial size of the second bearing is smaller than a radial size of the first bearing.

According to an exemplary embodiment of this application, the use of the second bearing having a smaller diameter enables a reduction in diameter of a portion, which is placed closer to the output side with respect to the plurality of planetary gears, of the output part. It is thus possible to miniaturize an object that is driven to rotate at the second rotation speed subjected to a reduction.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

Exemplary embodiments of the present invention will be described below with reference to the drawings. In this application, a direction parallel to a rotation axis of a sun gear will be referred to as an "axial direction", a direction perpendicular to the rotation axis will be referred to as a "radial direction", and a direction along an arc about the rotation axis will be referred to as a "circumferential direction". It should be noted that the "direction parallel to the rotation axis" involves a direction substantially parallel to the rotation axis. Moreover, the "direction perpendicular to the rotation axis" involves a direction substantially perpendicular to the rotation axis. In the following description, the right side of FIG. 1 along the rotation axis will be referred to as an "input side" and the left side of FIG. 1 along the rotation axis will be referred to as an "output side".

Figure 1:
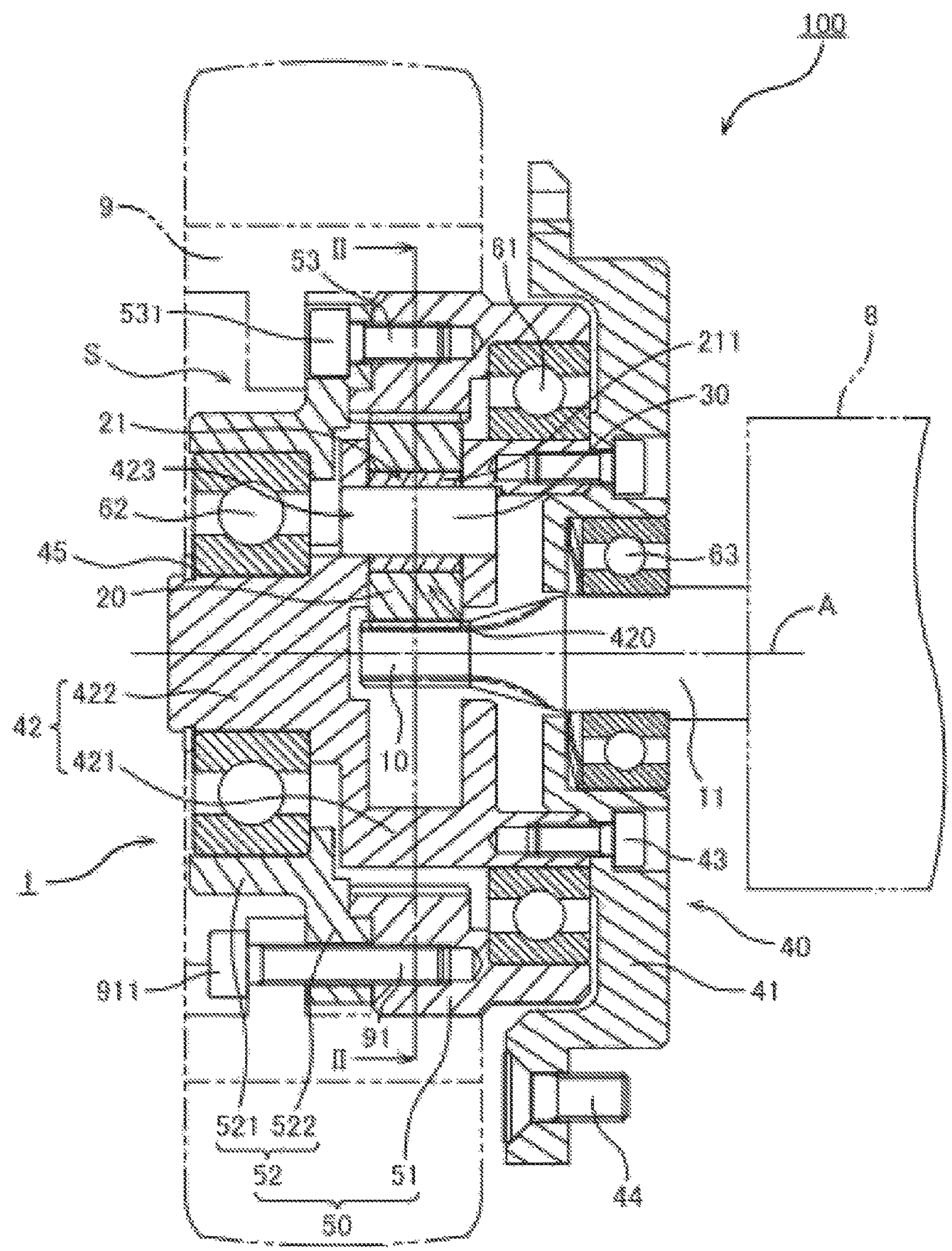
FIG. 1 is a longitudinal sectional view of an actuator.
Figure 2:
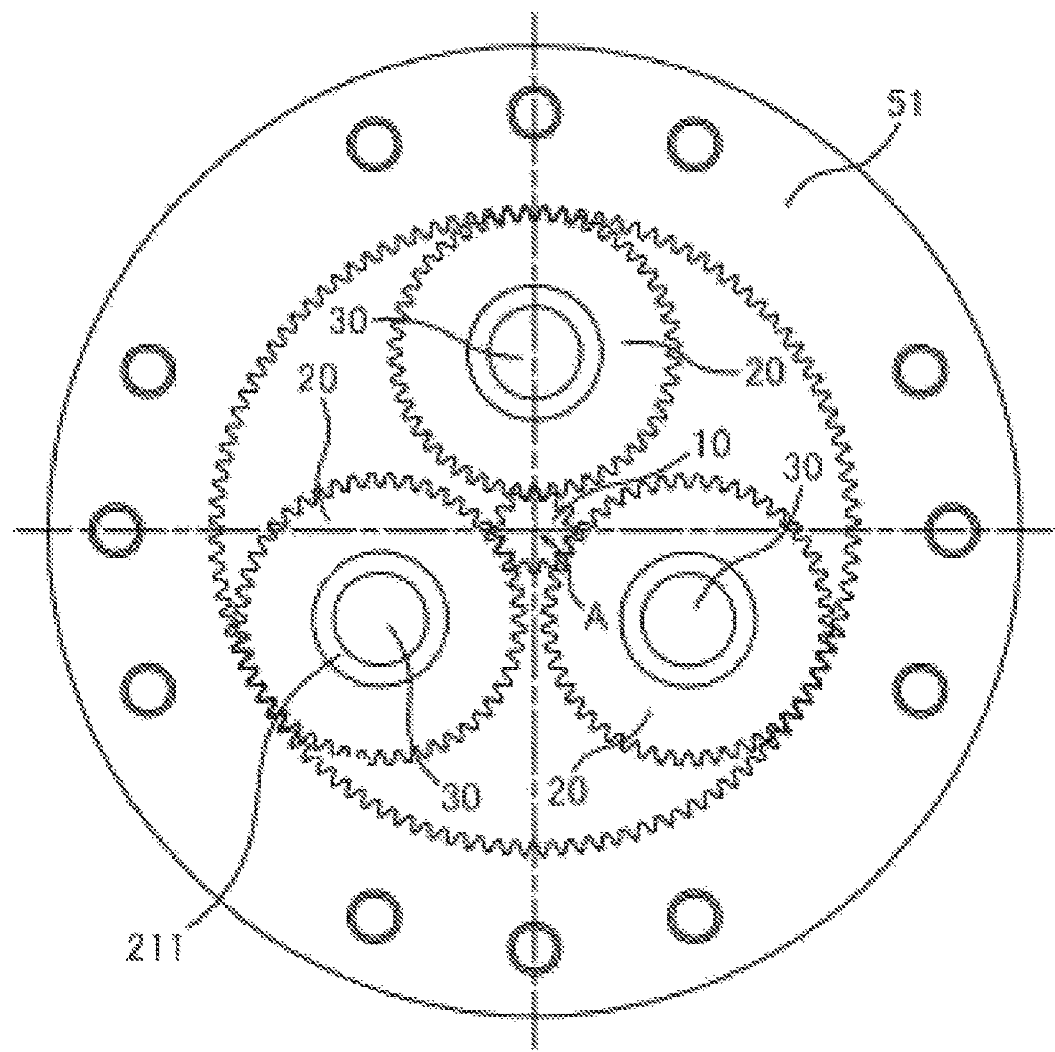
FIG. 2 is a partial cross sectional view of a speed reducer as seen from position II-II in FIG. 1.

FIG. 1 is a longitudinal sectional view of an actuator 100 that includes a speed reducer 1 according to an exemplary embodiment of the present invention. FIG. 2 is a partial cross sectional view of the speed reducer 1 as seen from position II-II in FIG. 1. It should be noted that hatch lines indicating a section are not shown in FIG. 2 for avoidance of complication.

The actuator 100 converts rotational motion at a first rotation speed, which is obtained from a motor 8, into rotational motion at a second rotation speed being lower than the first rotation speed to rotate a wheel 9. The actuator 100 is used for rotating wheel assemblies of wheelchairs, automated guided vehicles, balancing electric vehicles, electric walking assist cars, chair-type electric cars, and the like. However, the speed reducer and the actuator according to the present invention may be used for other purposes.

As illustrated in FIG. 1, the actuator 100 includes the motor 8, the speed reducer 1, and the wheel 9. The speed reducer 1 includes one sun gear 10, a plurality of planetary gears 20, a plurality of support pins 30, a fixed part 40, and an output part 50.

The sun gear 10 is disposed coaxially with a rotation axis A. As illustrated in FIG. 2, the sun gear 10 has on its outer peripheral face a plurality of external teeth. The sun gear 10 is directly or indirectly coupled to the motor 8 serving as a drive source. In this embodiment, the sun gear 10 is coupled to the motor 8 via an input shaft 11. The sun gear 10 and the input shaft 11 may be an integrated member or may be separate members fixed to each other. When the motor 8 is driven, the input shaft 11 and the sun gear 10 rotate about the rotation axis A at the first rotation speed.

The planetary gears 20 are disposed around the sun gear 10. In this embodiment, as illustrated in FIG. 2, three planetary gears 20 are spaced uniformly around the sun gear 10. However, the number of planetary gears 20 in the speed reducer 1 may be two or may be equal to or more than four. Each of the planetary gears 20 has on its outer peripheral face a plurality of external teeth. In this embodiment, each of the planetary gears 20 is larger in diameter than the sun gear 10. Moreover, each of the planetary gears 20 is larger in number of external teeth than the sun gear 10. The external teeth of the sun gear 10 mesh with the external teeth of each of the planetary gears 20.

The support pins 30 are disposed to support the planetary gears 20 in a rotatable manner. Each of the support pins 30 is formed of, for example, a columnar member extending in the axial direction. Each of the planetary gears 20 has a pin hole 21. Each of the pin holes 21 extends through a center of the corresponding planetary gear 20 in the axial direction. Each of the support pins 30 is inserted into the corresponding pin hole 21. Moreover, needle bearings 211 are interposed between inner peripheral faces of the planetary gears 20 and the support pins 30. The planetary gears 20 are thus supported to be rotatable about the support pins 30.

The fixed part 40 is stationary relative to a frame of a device on which the speed reducer 1 is mounted. In this embodiment, the fixed part 40 includes a first fixed member 41 and a second fixed member 42. The first fixed member 41 and the second fixed member 42 are fixed to each other with a bolt 43. The first fixed member 41 is also fixed with a bolt 44 to the frame of the device on which the speed reducer 1 is mounted.

The second fixed member 42 includes a gear holder 421 that holds the plurality of planetary gears 20, and a protrusion 422. Each of the support pins 30 has axial two ends fixed to the gear holder 421. The gear holder 421 has a plurality of cutout portions 420 in which the planetary gears 20 are housed respectively. The planetary gears 20 rotate inside the cutout portions 420 while being supported with the support pins 30. The protrusion 422 protrudes from the gear holder 421 toward the output side along the rotation axis A. The protrusion 422 has a cylindrical outer peripheral face the center of which is on the rotation axis A.

The output part 50 rotates at the second rotation speed subjected to a reduction. The output part 50 includes an internal gear 51 and a bearing holder 52. The internal gear 51 is formed in an annular shape so as to surround the plurality of planetary gears 20. As illustrated in FIG. 2, the internal gear 51 has on its inner peripheral face a plurality of internal teeth. The number of internal teeth of the internal gear 51 is larger than the number of external teeth of each of the planetary gears 20. The internal teeth of the internal gear 51 mesh with the external teeth of each of the planetary gears 20. In other words, the planetary gears 20 engage with both the sun gear 10 and the internal gear 51.

The bearing holder 52 is formed in an annular shape and is placed closer to the output side with respect to the internal gear 51. The bearing holder 52 includes a cylindrical portion 521 and a flange portion 522. The cylindrical portion 521 extends in the axial direction and is disposed coaxially with the rotation axis A. The flange portion 522 extends radially outward from an input-side end of the cylindrical portion 521. The internal gear 51 and the flange portion 522 are fixed to each other with a bolt 53. In addition, the internal gear 51, the flange portion 522, and the wheel 9 are fixed to one another with a bolt 91. The internal gear 51, the bearing holder 52, and the wheel 9 thus integrally rotate about the rotation axis A.

When the motor 8 serving as a drive source is driven, the input shaft 11 and the sun gear 10 rotate relative to the fixed part 40 at the first rotation speed. As the sun gear 10 rotates, the planetary gears 20 that engage with the sun gear 10 rotate about the support pins 30, respectively. As the planetary gears 20 rotate, the internal gear 51 that engages with the planetary gears 20 rotates about the rotation axis A. At this time, the internal gear 51 rotates relative to the fixed part 40 at the second rotation speed being lower than the first rotation speed. The output part 50 that includes the internal gear 51 and the wheel 9 that is fixed to the output part 50 thus rotate about the rotation axis A at the second rotation speed.

In the speed reducer 1, a lubricating oil (e.g., grease) is applied to surfaces of the respective members. The lubricating oil reduces friction between the members and causes the speed reducer 1 to operate smoothly.

As illustrated in FIG. 1, the speed reducer 1 includes a first bearing 61, a second bearing 62, and a third bearing 63.

The first bearing 61 is placed between the fixed part 40 and the output part 50 at a position closer to the input side with respect to the plurality of planetary gears 20. The first bearing 61 is, for example, a ball bearing. Instead of the ball bearing, the first bearing 61 may be any bearing such as a roller bearing. The first bearing 61 has an inner ring fixed to an outer peripheral face of the gear holder 421 of the second fixed member 42. The first bearing 61 has an outer ring fixed to the inner peripheral face, where no internal teeth are formed, of the internal gear 51.

The second bearing 62 is placed between the fixed part 40 and the output part 50 at a position closer to the output side with respect to the plurality of planetary gears 20. The second bearing 62 is, for example, a ball bearing. Instead of the ball bearing, the second bearing 62 may be any bearing such as a roller bearing. The second bearing 62 has an inner ring fixed to an outer peripheral face of the protrusion 422 of the second fixed member 42. The second bearing 62 has an outer ring fixed to an inner peripheral face of the cylindrical portion 521 of the bearing holder 52.

A snap ring 45 is fixed near an output-side end of the outer peripheral face of the protrusion 422. The snap ring 45 is in contact with an output-side end face of the inner ring of the second bearing 62 in the axial direction. The snap ring 45 thus prevents the second bearing 62 from being slipped off toward the output side.

The third bearing 63 is placed between the input shaft 11 and the fixed part 40. The third bearing 63 is, for example, a ball bearing. Instead of the ball bearing, the third bearing 63 may be any bearing such as a roller bearing. The third bearing 63 has an inner ring fixed to an outer peripheral face of the input shaft 11. The third bearing 63 has an outer ring fixed to an inner peripheral face of the first fixed member 41. The third bearing 63 that is interposed between the input shaft 11 and the fixed part 40 as described above permits the rotation of the input shaft 11 relative to the fixed part 40.

As described above, two bearings, i.e., the first bearing 61 and the second bearing 62 are interposed between the fixed part 40 and the output part 50. The output part 50 is thus supported to be rotatable relative to the fixed part 40 about the rotation axis A. In addition, the first bearing 61 and the second bearing 62 are spaced apart from each other in the axial direction. The output part 50 is thus less prone to be inclined relative to the rotation axis A.

In the speed reducer 1, the second bearing 62 that is disposed closer to the output side with respect to the planetary gears 20 is smaller in radial size than the first bearing 61 that is disposed closer to the input side with respect to the planetary gears 20. More specifically, the outer ring of the second bearing 62 is smaller in outer diameter than the outer ring of the first bearing 61. As described above, the use of the second bearing 62 having a smaller diameter enables a reduction in diameter of a portion, which is placed closer to the output side with respect to the planetary gears 20, of the output part 50. According to this embodiment, it is possible to reduce an outer diameter of the cylindrical portion 521 of the bearing holder 52. As a result, the wheel 9 having a smaller size is attached to the output part 50 with ease. Particularly in this embodiment, the second bearing 62 is placed radially inward of the wheel 9. Therefore, the miniaturization of the second bearing 62 facilitates the miniaturization of the wheel 9.

However, if the second bearing 62 is extremely miniaturized, the second bearing 62 may support the output part 50 unstably. For this reason, the second bearing 62 preferably has a diameter that is equal to or more than a certain value in order to attain a satisfactory supporting ability. For example, the second bearing 62 preferably has such a diameter that at least a part of the second bearing 62 overlaps the support pins 30 as seen in axial view. In FIG. 1, a radial length from the rotation axis A to an inner peripheral face of the second bearing 62 is shorter than a radial length from the rotation axis A to a radially inner edge of each support pin 30. In addition, a radial length from the rotation axis A to an outer peripheral face of the second bearing 62 is longer than a radial length from the rotation axis A to a radially outer edge of each support pin 30.

Also in this embodiment, as illustrated in FIG. 1, the second bearing 62 is larger in section perpendicular to the circumferential direction than the first bearing 61. More specifically, the second bearing 62 is larger in axial dimension than the first bearing 61. In addition, the second bearing 62 is larger in radial dimension from the inner peripheral face to the outer peripheral face than the first bearing 61. It becomes possible to secure the supporting ability of the second bearing 62 having a smaller diameter, by increasing the sectional dimension of the second bearing 62 as described above.

Also in this embodiment, the second fixed member 42 of the fixed part 40 includes the gear holder 421 and the protrusion 422 that protrudes from the gear holder 421 to the output side. The protrusion 422 is smaller in diameter of the outer peripheral face than the gear holder 421. The second bearing 62, the bearing holder 52, a head 531 of the bolt 53, and a head 911 of the bolt 91 are housed in a space S that is formed closer to the output side with respect to the gear holder 421 and the internal gear 51 and radially outward of the protrusion 422. With this configuration, it is possible to prevent these members from protruding toward the output side beyond an output-side end face of the protrusion 422. It is also possible to prevent these members from protruding radially outward of the outer peripheral face of the internal gear 51. As a result, it is possible to further miniaturize the speed reducer 1 in both the axial direction and the radial direction.

Also in this embodiment, the second fixed member 42 has a circular hole 423 for fixing an output-side end of each support pin 30. The circular hole 423 has an input-side opening and an output-side opening. In other words, the circular hole 423 is a through-hole. This configuration facilitates a change in diameter of the circular hole 423 by processing. In turn, this configuration facilitates a change in diameter of each support pin 30. Particularly, the support pins 30 having a larger diameter allow use of a needle bearing 211 capable of enduring higher load. It is accordingly possible to prolong the life of the speed reducer 1. It is also possible to enhance the output torque from the actuator 100.

In this embodiment, as described above, the output part 50 includes the internal gear 51 and the bearing holder 52. The internal gear 51 and the bearing holder 52 are separate members and are fixed to each other with the bolts 53 and 91.

Since the internal gear 51 and the bearing holder 52 are provided as separate members, the internal gear 51 and the bearing holder 52 may be respectively made of different materials in accordance with required strength. Specifically, the bearing holder 52 is lower in required strength than the internal gear 51. Therefore, the internal gear 51 may be made of, for example, an alloy with high strength, whereas the bearing holder 52 may be, for example, a die-casting made of light-weight and inexpensive aluminum. In addition, when the internal gear 51 and the bearing holder 52 are provided as separate members, the shapes of the respective members are simplified. Accordingly, the respective members can be subjected to processing with ease. As a result, the output part 50 can be manufactured at reduced material cost and reduced processing cost.

According to the structure of this embodiment, the internal gear 51 and the wheel 9 are coupled to each other with the bolt 91, with the bearing holder 52 interposed therebetween. Therefore, so-called "alignment" work for aligning the axial center of the wheel 9 with the axial center of the internal gear 51 can be directly conducted between the wheel 9 and the internal gear 51. In addition, torque is directly transmitted from the internal gear 51 to the wheel 9. Accordingly, degradation in mounting accuracy and reduction in torque transmission hardly occur even when the internal gear 51 and the bearing holder 52 are provided as separate members.

An exemplary embodiment of the present invention has been described above; however, the present invention is not limited to the foregoing embodiment.

Figure 3:
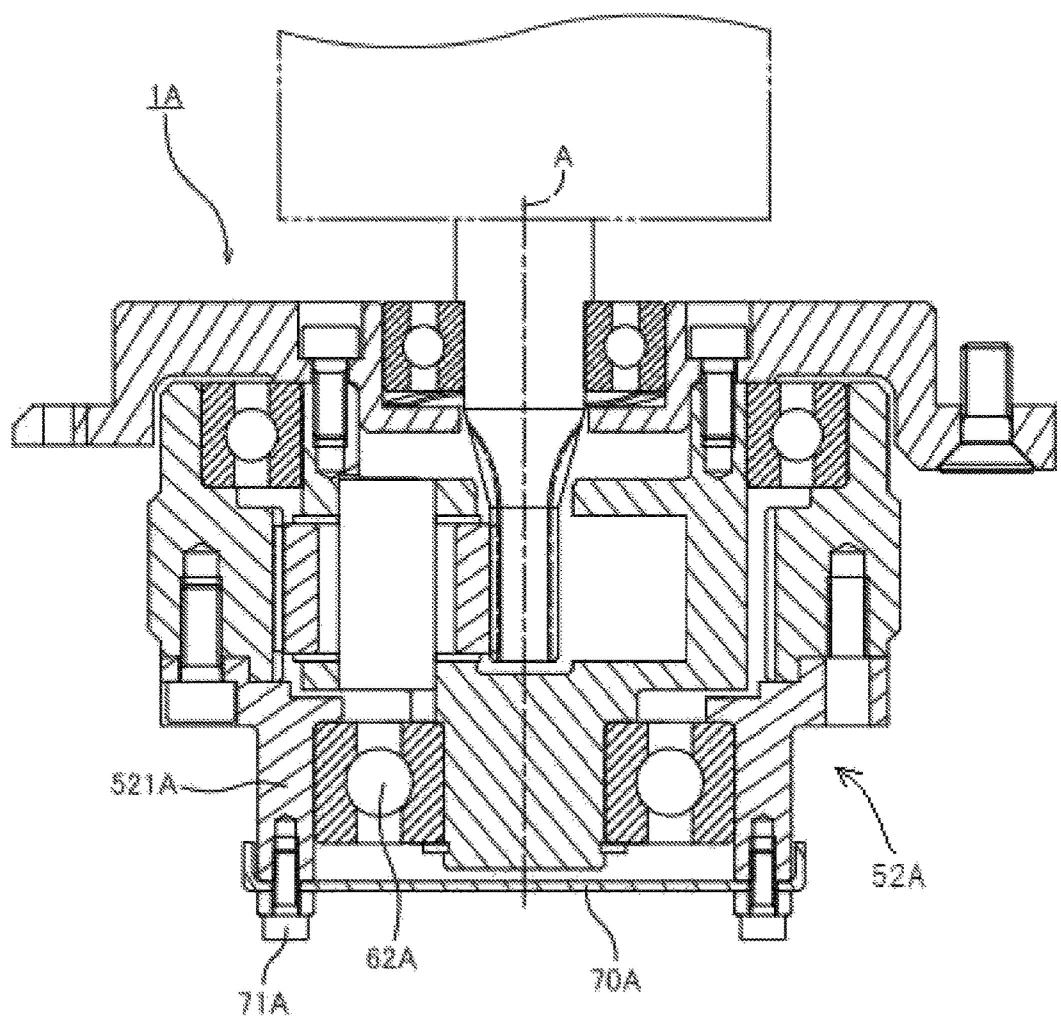
FIG. 3 is a longitudinal sectional view of a speed reducer according to a modification.

FIG. 3 is a longitudinal sectional view of a speed reducer 1A according to a modification. The speed reducer 1A illustrated in FIG. 3 is incorporated in an impeller of a ceiling fan to rotate the impeller. As illustrated in FIG. 3, the speed reducer 1A for use in the ceiling fan is mounted with its output side directed downward. Therefore, the speed reducer 1A illustrated in FIG. 3 includes an oil receiving cover 70A. The oil receiving cover 70A is placed closer to an output side with respect to a second bearing 62A. The oil receiving cover 70A is formed in a disc shape and is disposed perpendicularly to a rotation axis A. The oil receiving cover 70A has a peripheral edge that is fixed to a cylindrical portion 521A of a bearing holder 52A with a bolt 71A.

With this configuration, even if a lubricating oil (e.g., grease) in the speed reducer 1A drops downward from the second bearing 62A, the oil receiving cover 70A receives the lubricating oil. It is accordingly possible to prevent the lubricating oil from dropping downward with respect to the oil receiving cover 70A.

In the foregoing embodiment, the internal gear and the bearing holder in the output part are separate from the wheel. Alternatively, the internal gear or the bearing holder may be integrated with the wheel. In other words, the wheel may be a part of the speed reducer. Likewise, in FIG. 3, an internal gear or a bearing holder may be integrated with a part of the impeller.

Also in the foregoing embodiment, the sun gear, the planetary gears, and the internal gear each are a tooth gear that transmits power by mesh of teeth. Alternatively, the sun gear, the planetary gears, and the internal gear each may be a traction gear that transmits power by frictional force.

Moreover, the speed reducer according to the present invention may be configured to rotate any object to be driven, in addition to the wheel and the impeller.

With regard to the details of the speed reducer and actuator, the shapes may be different from those illustrated in the drawings of this application. The respective elements described in the foregoing embodiment and modification may be combined appropriately as long as no conflict arises.

The present invention is applicable to, for example, a speed reduction device and a wheel unit.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A speed reducer for converting rotational motion about a rotation axis extending between an input side and an output side, at a first rotation speed into rotational motion at a second rotation speed being lower than the first rotation speed, the speed reducer comprising:

a fixed part;

a sun gear that rotates relative to the fixed part about the rotation axis at the first rotation speed;

a plurality of planetary gears that are disposed around the sun gear to engage with the sun gear;

an output part that includes an internal gear having an annular shape and engaging with the plurality of planetary gears and rotates relative to the fixed part at the second rotation speed;

a first bearing that is interposed between the fixed part and the output part at a position closer to the input side with respect to the plurality of planetary gears; and a second bearing that is interposed between the fixed part and the output part at a position closer to the output side with respect to the plurality of planetary gears, wherein a radial size of the second bearing is smaller than a radial size of the first bearing.

2. The speed reducer according to claim 1, further comprising a plurality of support pins that axially extend from the fixed part and respectively support the planetary gears in a rotatable manner, wherein at least a part of the second bearing overlaps each of the support pins as seen in axial view.

3. The speed reducer according to claim 2, wherein a radial length from the rotation axis to an inner peripheral face of the second bearing is shorter than a radial length from the rotation axis to a radially inner edge of each of the support pins.

4. The speed reducer according to claim 2, wherein a radial length from the rotation axis to an outer peripheral face of the second bearing is longer than a radial length from the rotation axis to a radially outer edge of each of the support pins.

5. The speed reducer according to claim 1, wherein a section of the second bearing is larger than a section of the first bearing, the sections being perpendicular to a circumferential direction.

6. The speed reducer according to claim 1, wherein an axial dimension of the second bearing is larger than an axial dimension of the first bearing.

7. The speed reducer according to claim 1, wherein a radial dimension from an inner peripheral face to an outer peripheral face of the second bearing is larger than a radial dimension from an inner peripheral face to an outer peripheral face of the first bearing.

8. The speed reducer according to claim 1, wherein the fixed part includes:

a gear holder that holds the plurality of planetary gears; and a protrusion that axially protrudes from the gear holder and has an outer peripheral face formed in a cylindrical shape and being smaller in diameter than an outer peripheral face of the gear holder, and the second bearing has an inner ring fixed to the outer peripheral face of the protrusion.

9. The speed reducer according to claim 1, further comprising a wheel that rotates together with the output part.

10. The speed reducer according to claim 9, wherein the second bearing is placed radially inward of the wheel.

11. The speed reducer according to claim 1, wherein the output part includes:

the internal gear; and a bearing holder that is separate from the internal gear and is fixed to the internal gear, and the second bearing has an outer ring fixed to an inner peripheral face of the bearing holder.

12. The speed reducer according to claim 11, wherein a material for the internal gear is higher in strength than a material for the bearing holder.

13. The speed reducer according to claim 1, further comprising a lubricating oil that is applied to surfaces of at least some of the members; and an oil receiving cover that is placed closer to the output side with respect to the second bearing.

14. The speed reducer according to claim 13, wherein the oil receiving cover is disposed perpendicularly to the rotation axis and is fixed to the fixed part.

15. An actuator comprising:

the speed reducer according to claim 1; and a motor that is directly or indirectly coupled to the sun gear, wherein the sun gear rotates at the first rotation speed when the motor is driven.

* * * * *